United States Patent
Grimm et al.

(10) Patent No.: US 6,386,622 B1
(45) Date of Patent: May 14, 2002

(54) ONE PIECE MOLDED PICK-UP BED WITH FENDERS

(75) Inventors: Rainer Grimm, Frankfurt (DE); Holly Giangrande, Troy; Roch Tolinski, Howell, both of MI (US); Carmelo Mondello, Frankfurt (DE); Steven Foster, Rochester Hills, MI (US); Charlie Hopson, Lebanon, TN (US); Laurent Arquevaux, Sully sur Loire (FR); Nick Kalageros, West Midlands (GB)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/592,701

(22) Filed: Jun. 13, 2000

(51) Int. Cl.⁷ .............................. B60J 7/00; B60J 10/00; B60K 37/00; B60N 2/00; B60N 3/00
(52) U.S. Cl. ...................................... 296/183
(58) Field of Search ................ 296/183, 39.1, 296/39.2

(56) References Cited

U.S. PATENT DOCUMENTS

| | | | |
|---|---|---|---|
| D248,386 S | * | 7/1978 | Hefner |
| 4,613,183 A | * | 9/1986 | Kesling |
| 4,890,874 A | * | 1/1990 | Davis |
| 4,986,590 A | * | 1/1991 | Patti et al. |
| 5,725,712 A | * | 3/1998 | Spain et al. |
| 5,755,481 A | * | 5/1998 | Emery |
| RE36,457 E | | 12/1999 | Ellison |
| 6,036,258 A | * | 3/2000 | Clare et al. |
| 6,042,678 A | | 3/2000 | Johnson |
| 6,059,343 A | * | 5/2000 | Emery |
| 6,089,639 A | | 7/2000 | Wojnowski |
| 6,168,742 B1 | | 1/2001 | Yamamoto |
| 6,180,207 B1 | | 1/2001 | Preisler |
| 6,187,233 B1 | | 2/2001 | Smith |

* cited by examiner

*Primary Examiner*—Stephen T. Gordon
*Assistant Examiner*—Scott Carpenter
(74) *Attorney, Agent, or Firm*—Carlson, Gaskey & Olds

(57) ABSTRACT

A vehicle pick-up bed with fenders is disclosed that can be folded into shape by hand. The component includes a generally flat sheet of colored material and a generally flat sheet of reinforced polymeric material. Preferably, the sheet of colored material is placed in the mold and the reinforced polymeric material is injected into the mold, onto the back of the sheet of colored material. During the molding process, the reinforced polymeric material and the colored material are molded into a single, generally flat, solid component. The sheet of colored material adheres to the reinforced polymeric material. Once molded, the sides of the pick-up bed and fenders are folded into shape along hinge edges. The side walls are connected to stay in place. Hinge edges could be formed by locating few or no reinforcing fibers in the reinforced polymeric material in the desired location of the hinge edges. The colored material is preferably a paintless polymer film. Alternatively, the colored material is pre-painted aluminum. As a result of using either of these two options, there is great flexibility in adding color to the vehicle. Due to the injection molding process, additional features can be directly molded into the component. For instance, a drainage system, brake light attachments, brake light covers, wiring conduit or a cargo cover can be directly molded into the component.

20 Claims, 5 Drawing Sheets

ONE PIECE MOLDED PICK-UP BED WITH FENDERS

BACKGROUND OF THE INVENTION

This invention generally relates to a vehicle pick-up bed and more particularly to a pick-up bed including fenders made of polymeric material that can be folded into shape.

The open section in the back of a pick-up truck is commonly referred to as a pick-up bed. Pick-up beds include a base section, three side walls, and a tailgate. The base section is also known as the floor of the bed. Two of the side walls are the same size, positioned parallel to each other, and extend along the sides of the vehicle adjacent the tires. The third side wall is positioned perpendicular to and between the first two side walls, adjacent the cab of the pick-up truck. Finally, the lift-gate is positioned perpendicular to and between the first two side walls at their opposite ends from the third side wall, at the rear of the vehicle. The lift-gate is essentially a door that opens to allow access into the pick-up bed. Typically, pick-up beds are used for storing and transporting large objects. Fenders are guards positioned over each wheel of a vehicle and are generally semi-circular in shape.

Currently, pick-up beds and fenders are formed from metal. However, there are several disadvantages of metal pick-up beds and fenders, including, but not limited to, susceptibility to denting and corrosion.

Since it is common to transport objects in a pick-up bed, there is a high probability that the bed will dent or scratch during loading and unloading. Further, if the bed is made from metal, a scratch will cause corrosion. Currently pick-up truck owners sometimes use bedliners to minimize denting and scratching of the pick-up bed. Typically, a bedliner is a plastic insert that fits into the pick-up bed to protect the base section and side walls. The disadvantage of a bedliner is that it is an additional expense for the pick-up truck owner. Therefore, there is a need for a pick-up bed that resists denting and scratching without the use of a bedliner.

There is also a high probability that the fender sections will get dented or scratched when the pick-up truck is parked close to other vehicles in a parking lot. Further, if the fender sections are made from metal, scratches or dents will cause corrosion.

Another disadvantage of metal pick-up beds and fenders is that they are costly to produce because they are manufacturing intensive. There are several different methods of manufacturing pick-up beds. One method is to form the bed from several metal pieces. Each metal piece is individually stamped and, typically, all the pieces are welded together. Fenders are also manufactured separately from the body of the vehicle and attached to the body during vehicle assembly. Metal pick-up beds and fenders both require painting to match the color of the vehicle.

Yet another disadvantage of using metal for the pick-up bed and fenders is its weight. For instance, as the weight of a vehicle increases, the gas mileage of the vehicle decreases. Therefore, it is desirable to decrease the weight of the vehicle to improve a variety of vehicle performance factors, including, gas mileage.

SUMMARY OF THE INVENTION

The pick-up bed of the present invention overcomes the above problems with known pick-up beds and fenders. In general terms, the pick-up bed and fenders of the present invention include a generally flat sheet of colored material and a generally flat sheet of reinforced polymeric material molded to the sheet of colored material. The colored material is preferably a paintless polymeric film or alternatively pre-painted aluminum. Preferably, the generally flat sheet of colored material is placed in the bottom of a mold and a mixture of reinforced polymeric material is injected onto the back of the sheet of colored material. During the molding process the two materials are adhered or bond together, forming a generally flat molded pick-up bed/fenders component. Once the molding is complete, the pick-up bed/fenders component is folded into the shape of a pick-up box.

This application is related to co-pending application 09/592,325, entitled "One Piece Molded Pick-Up Bed", and filed on even date with this application.

The molded pick-up bed/fenders component includes a generally rectangular center section having three hinge edges. There are also three generally rectangular side wall sections attached to the center section, each aligned with one of the three hinge edges. There are two parallel side walls and one side wall that is positioned between and perpendicular to the other two side walls. There are also two connecting sections and two fender sections. Each connecting section is attached to one of the parallel side walls via a hinge edge and each fender section is attached to one of the connecting sections via a hinge edge. The hinge edges are bendable because fewer or no reinforcing fibers are located along the hinge edges.

The combined pick-up bed and fenders of the present invention is less expensive and simpler to manufacture than metal pick-up beds and fenders. One reason is that fewer components need to be manufactured. Further, those components that are manufactured are cheaper to produce. Also, the completely assembled pick-up bed and fenders do not need to be painted because the sheet of colored material, either paintless film or pre-painted aluminum is adhered or molded to the sheet of reinforced polymeric material prior to folding the pick-up bed and fenders into shape. Using paintless film or pre-painted aluminum to add color to the pick-up bed and fenders is less expensive than painting the bed and fenders after assembly to match the color of the vehicle.

Further, the combined pick-up bed and fenders of the present invention significantly reduces the weight of the vehicle since the materials that comprise the component are lightweight polymers or aluminum. There is no need to use a bedliner with the pick-up bed of the present invention because the polymeric material and aluminum, if used, resist denting and corrosion.

These and other features of the invention may be best understood from the following specification and drawings. The following is a brief description of the drawings.

DETAILED DESCRIPTION OF THE PREFERRED EMBODIMENT

Figure 1:
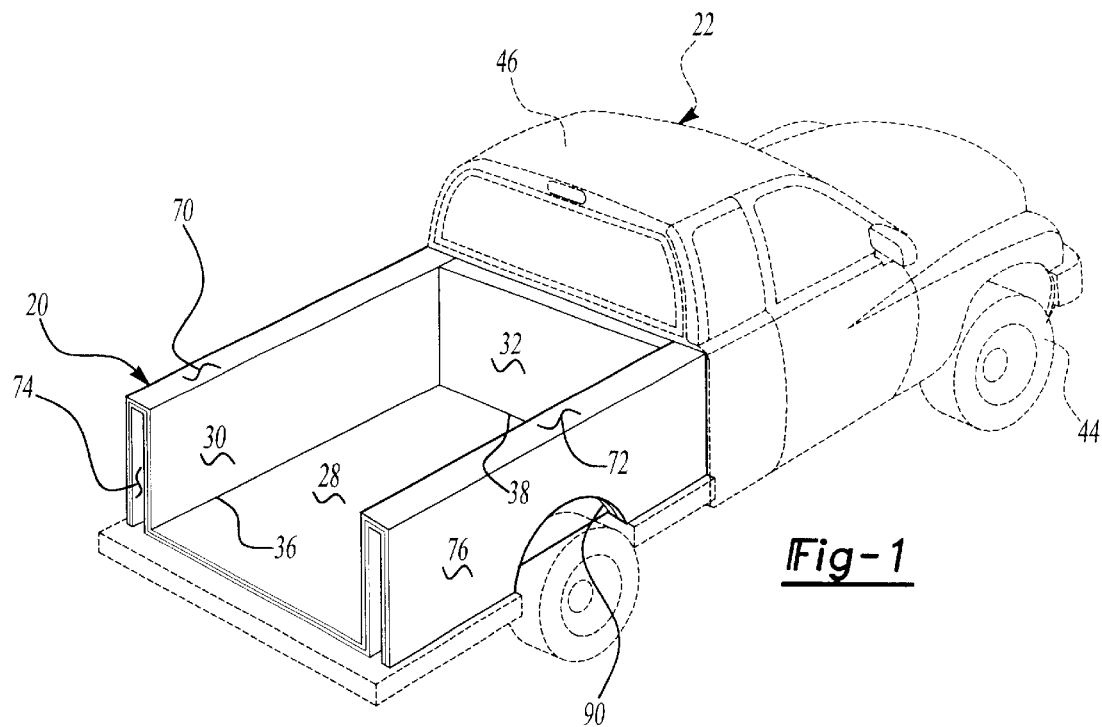
FIG. 1 is a perspective view shown partially in phantom of the device of the present invention installed in a pick-up truck.
Figure 2:
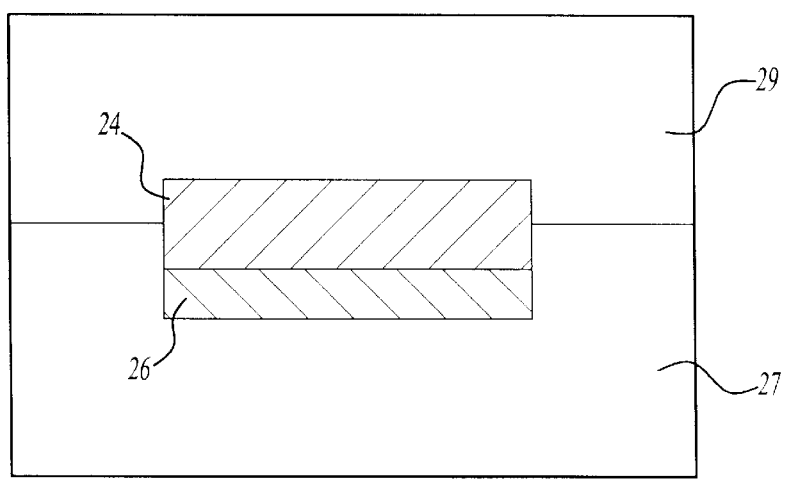
FIG. 2 is a cutaway view of molding the present invention.
Figure 3:
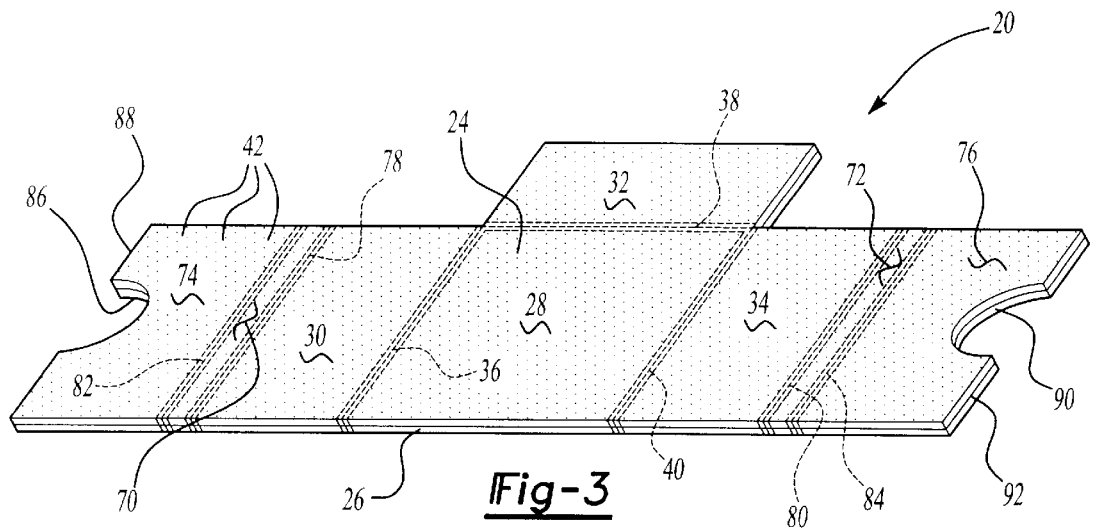
FIG. 3 is a perspective view of the adhered materials prior to folding the device of the present invention into shape.

FIG. 1 illustrates the combined vehicle pick-up bed and fenders of the present invention, shown generally at 20, installed in a pick-up truck 22. As shown in FIG. 2, the bed/fenders component 20 is formed from a sheet of colored material 26 adhered to a generally flat sheet of reinforced polymeric material 24. In other words, the generally flat sheet of colored material 26 is molded to reinforced polymeric material 24. Preferably, the generally flat, colored sheet of material 26 is placed in the bottom of a mold 27, having a mold halve 29. The mold is shown schematically. The reinforced polymeric material 24 is injected into the mold 27, 29 over the colored sheet of material 26, preferably onto the back of the colored sheet of material 26. The reinforced polymeric material 24 and the colored material 26 are molded into a solid, generally flat component. During the molding process the sheet of colored material 26 adheres to the reinforced polymeric material 24, forming a single component 20. As shown in FIG. 3, the molded component 20 is generally flat and includes the colored layer 26 and the layer of reinforced polymeric material 24 adhered together.

Rather than using a prefabricated material 26, a two shot mold technique could form material 26 in the mold. Further, materials 24 and 26 could be made separately and attached outside the mold.

When the molding process is complete, the generally flat component 20 is folded into the shape of the pick-up bed and fenders 20. Fewer or no reinforcing fibers are located in areas where the component 20 is designed to fold and bend. The assembled component comprising the pick-up bed and fenders 20 is then connected to the pick-up truck 22. Preferably, metal attachments are used to secure the component 20 to the body of the pick-up truck 22. The metal attachments can be directly molded into the component 20.

The colored sheet of material 26 is preferably a paintless polymer film. Alternatively, the colored sheet of material 26 could be pre-painted aluminum.

The pick-up bed with fenders component 20 including the adhered reinforced polymeric material 24 and colored material 26 form a center section 28, a first side wall section 30, a second side wall section 32, a third side wall section 34, a first connecting section 70, a second connecting section 72, a first fender section 74, and a second fender section 76. The center section 28, first side wall section 30, second side wall section 32, the third side wall section 34, first connecting section 70, second connecting section 72, first fender section 74 and second fender section 76 are all generally rectangular. Since either a paintless polymeric film or prepainted aluminum is used to color the pick-up bed, each section could be a different color. For example, different color sheets of colored material 26 can be used for different sections 28, 30, 32, 34, 70, 72, 74, 76. In other words, there is much greater flexibility in color options. For example, sections 28, 30, 32, 34 could all be black to form the interior of the bed, while sections 70, 72, 74, 76 could be the exterior color of the vehicle.

The details of the unfolded bed/fender can be best understood from FIG. 3. Each of the side wall sections 30, 32, 34 is connected to the center section 28 via a hinge edge. A first hinge edge 36 is positioned between the center section 28 and the first side wall section 30. A second hinge edge 38 is positioned between the center section 28 and the second side wall section 32. A third hinge edge 40 is positioned between the center section 28 and the third side wall section 34.

The connecting sections 70, 72 are connected to side walls 30, 34 via hinge edges. The first side wall section 30 has a fourth hinge edge 78 along the edge opposite the first hinge edge 36. The first connecting section 70 is connected to the first side wall section 30 via the fourth hinge edge 78. The third side wall section 34 has a fifth hinge edge 80 along the edge opposite the third hinge edge 40. The second connecting section 72 is connected to the third side wall section 34 via the fifth hinge edge 80.

The fender sections 74, 76 are also connected to connecting sections 70, 72 via hinge edges. The first connecting section 70 has a sixth hinge edge 82 along the edge opposite the fourth hinge edge 78. The first fender section 74 is connected to the first connecting section 70 via the sixth hinge edge 82. Similarly, the second connecting section 72 has a seventh hinge edge 84 along the edge opposite the fifth hinge edge 80. The second fender section 76 is connected to the second connecting section 72 via the seventh hinge edge 84. Each of the fender sections 74, 76 has a semi-circular aperture for access to one of the vehicle's tires. The first fender section 74 has a semi-circular aperture 86 along the edge 88 opposite the sixth hinge edge 82. The second fender section 76 has a semi-circular aperture 90 along an edge 92 opposite the seventh hinge edge 84.

The reinforced polymeric material is reinforced with reinforcing fibers 42. Preferably, hinge edges 36, 38, 40, 78, 80, 82, 84 are formed by including fewer reinforcing fibers 42 in the vicinity of the hinge edges 36, 38, 40, 78, 80, 82, 84. Alternatively, there are no reinforcing fibers 42 located in the vicinity of the hinge edges 36, 38, 40, 78, 80, 82, 84. A worker in this art would know how to achieve this goal. Other ways of forming a hinge can be used.

Figure 4:
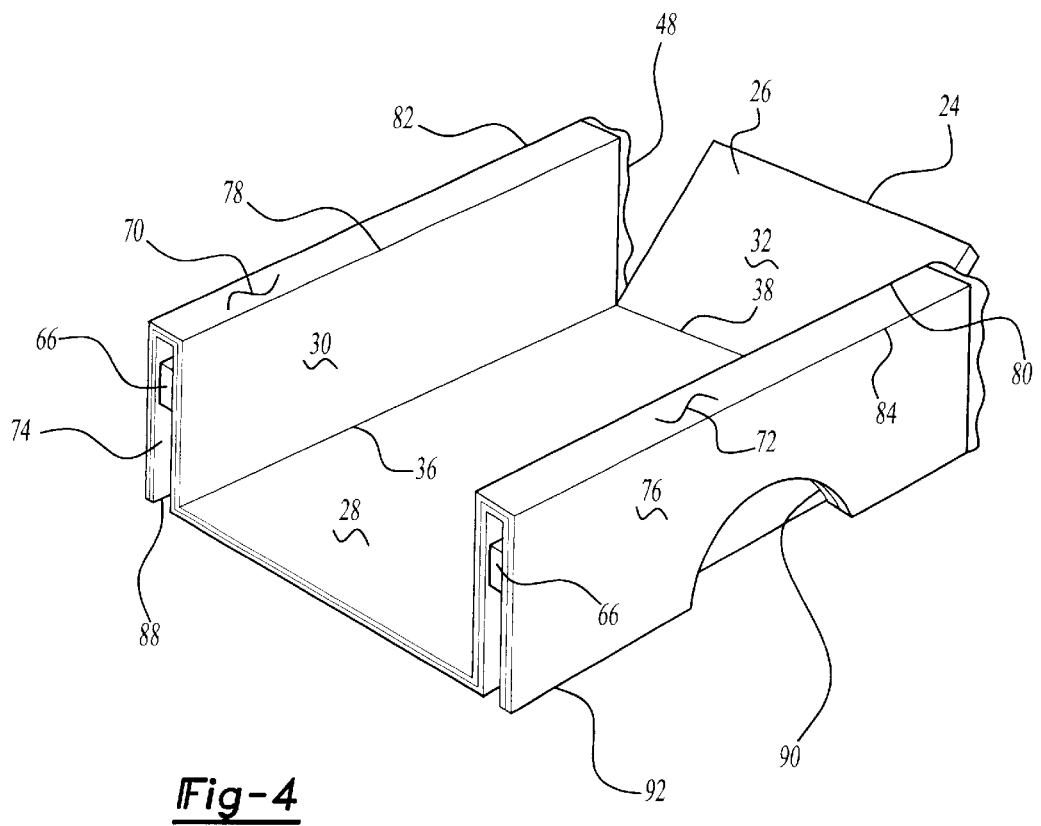
FIG. 4 is a perspective view of the device of the present invention being folded into shape.

As shown in FIG. 4, preferably the first, second, and third side wall sections 30, 32, 34 are folded toward the colored sheet of material 26. The side wall sections 30, 32, 34 are folded until they are perpendicular to the center section 28, or positioned approximately 90° from the center section 28.

As can be seen in FIG. 1, the first and third side wall sections 30, 34 run parallel to each other along the sides of the vehicle adjacent the tires 44. The second side wall section 32 is positioned between and perpendicular to the first and third side wall sections 30, 34. The second side wall section 32 is adjacent the cab 46 of the vehicle 22.

Once the sidewall sections are folded into shape, they are connected together. As shown in FIG. 4, the first side wall section 30 connects to the second side wall section 32 and the second side wall section 32 connects to the third side wall section 34. In other words, there will be two seams. One seam is between the first side wall section 30 and the second side wall section 32. The other seam is between the second side wall section 32 and the third side wall section 34. Preferably, the side wall sections are connected by plastic welding. Alternatively, the side wall sections snap together.

Figure 5:
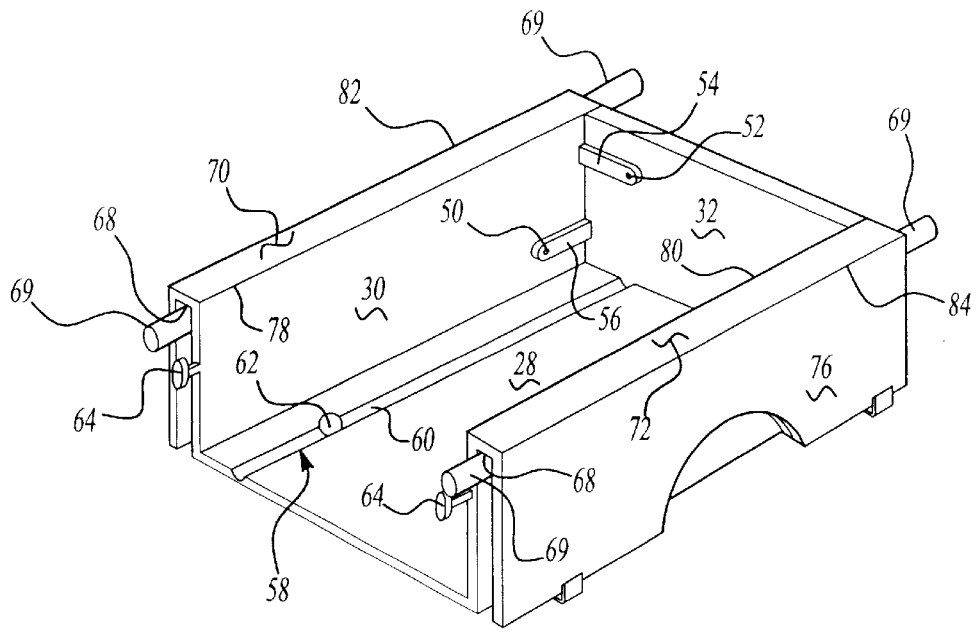
FIG. 5 is a perspective view of an alternative embodiment of the present invention.

The side wall sections are plastically welded together by applying an adhesive 48 to the edges of the two side walls that need to be connected. In an alternative embodiment, as shown in FIG. 5, each side wall has at least one projection 50, 52 and at least one flap 54, 56 having a hole for receiving a projection 50, 52 for each seam. For example, only one seam is shown in FIG. 5. The projection 50 on the first side wall section 30 is aligned with the flap 56 on the second side wall section 32. The projection 52 on the second side wall section 32 is aligned with the flap 54 on the first side wall section 30. Each projection 50, 52 snaps into its corresponding flap 54, 56 hole.

The first and second connecting sections 70, 72 are folded toward the reinforced polymeric material 24 along the fourth and fifth hinge edges 78, 80. The first connecting section 70 is folded generally 90° from the first side wall 30. The second connecting section 72 is folded generally 90° from the third side wall 34.

The first and second fender sections 74, 76 are also folded toward the reinforced polymeric material 24 along the sixth and seventh hinge edges 82, 84. The first fender section 74 is folded generally 90° from the first connecting section 70. The second fender section 76 is folded generally 90° from the second connecting section 72.

The hinge edges 36, 38, 40, 78, 80, 82, 84 are flexible enough that the side wall sections 30, 32, 34, the connecting sections 70, 72 and the fender sections 74, 76 can be folded into place by hand. No other tooling is required. Alternatively, the side wall sections 30, 32, 34, the connecting sections 70, 72 and the fender sections 74, 76 can be folded into shape by a robot. Robots would be used to facilitate production, not because a large force is required to fold the side wall sections.

Figure 6:
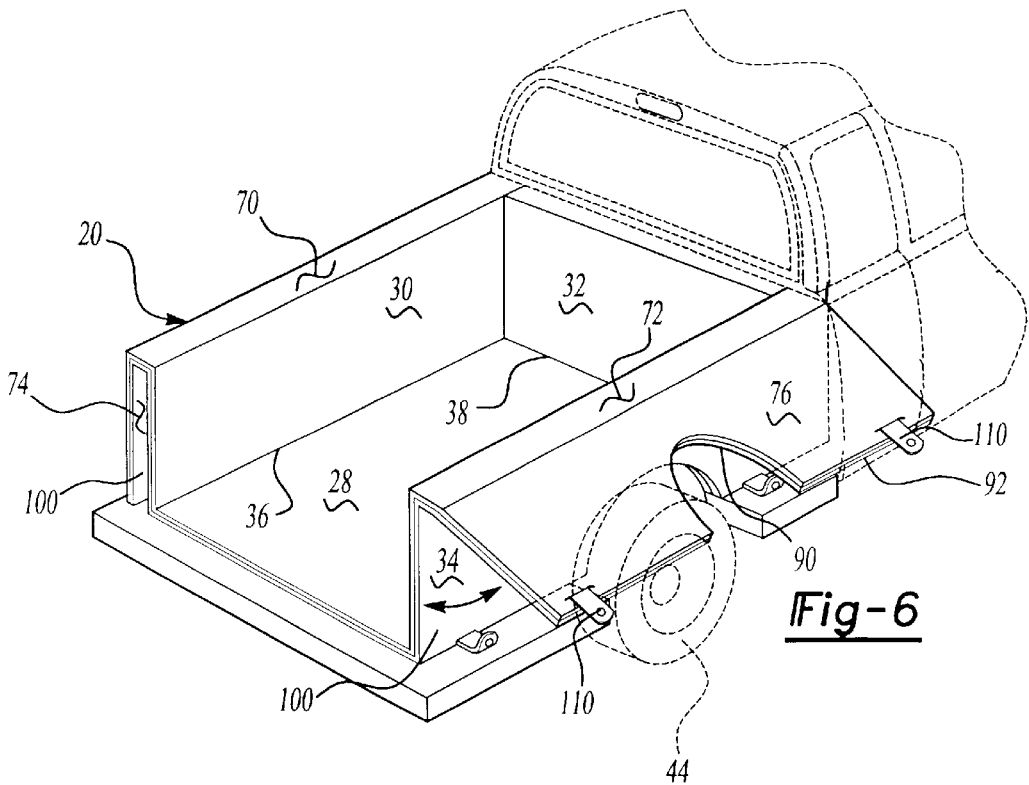
FIG. 6 is a perspective view of the device of the present invention with a fender section in an open position revealing a storage area.

As shown in FIG. 6, an optional feature of the pick-up bed with fenders are storage compartments 100 positioned between the fender sections 74, 76 and the side walls 30, 34. The first fender section 74 opens for access to storage area 100 between the first side wall 30 and the first fender section 74. The second fender section 76 opens for access to a storage area 100 between the third side wall 34 and the second fender section 76. In this embodiment, some removal attachment, such as snaps 110, etc. removeably receive the sections 74, 76 to walls 34, 36. Several additional features can be directly molded into the pick-up bed/fenders component 20. For instance, a drainage system can be molded into the pick-up bed/fenders component 20. The drainage system prevents water from accumulating in the pick-up bed. One possible drainage system 58 is shown in FIG. 5. Grooves 60 and drainage holes 62 can be formed in the center section 28 of the pick-up bed. Although only one groove and one drainage hole are shown, any number of them can be molded into the pick-up bed.

Brake light attachments 64 can also be directly molded into the pick-up bed/fenders component 20. Brake light covers connect to the vehicle via the brake light attachments 64f. Further, brake light covers 66 can be directly molded into the pick-up bed/fenders component. (See FIG. 4) Incorporating either brake light attachments 64 or the brake light covers 66 themselves eliminates the need to manufacture and add additional components to the vehicle during the assembly process. Attachments can be directly molded into the component 20 to allow fastening the bed assembly 20 to the vehicle chassis. The attachments can be metal or any other material. Further, other types of attachments can be directly molded into the component for other purposes. For instance, attachments can be directly molded into the component 20 to receive a cargo cover for the pick-up bed.

Another possibility is to directly mold wiring conduit 68 into the pick-up bed/fenders component 20. (See FIG. 5) Wiring conduit 68 is a compartment used to contain and isolate the wires 69 that run throughout the vehicle. Essentially, in the present invention the wires 69 become encapsulated by the reinforced polymeric material 24 during the molding process. Therefore, a short is less likely to occur than in wires running through standard wiring conduit.

Figure 7:
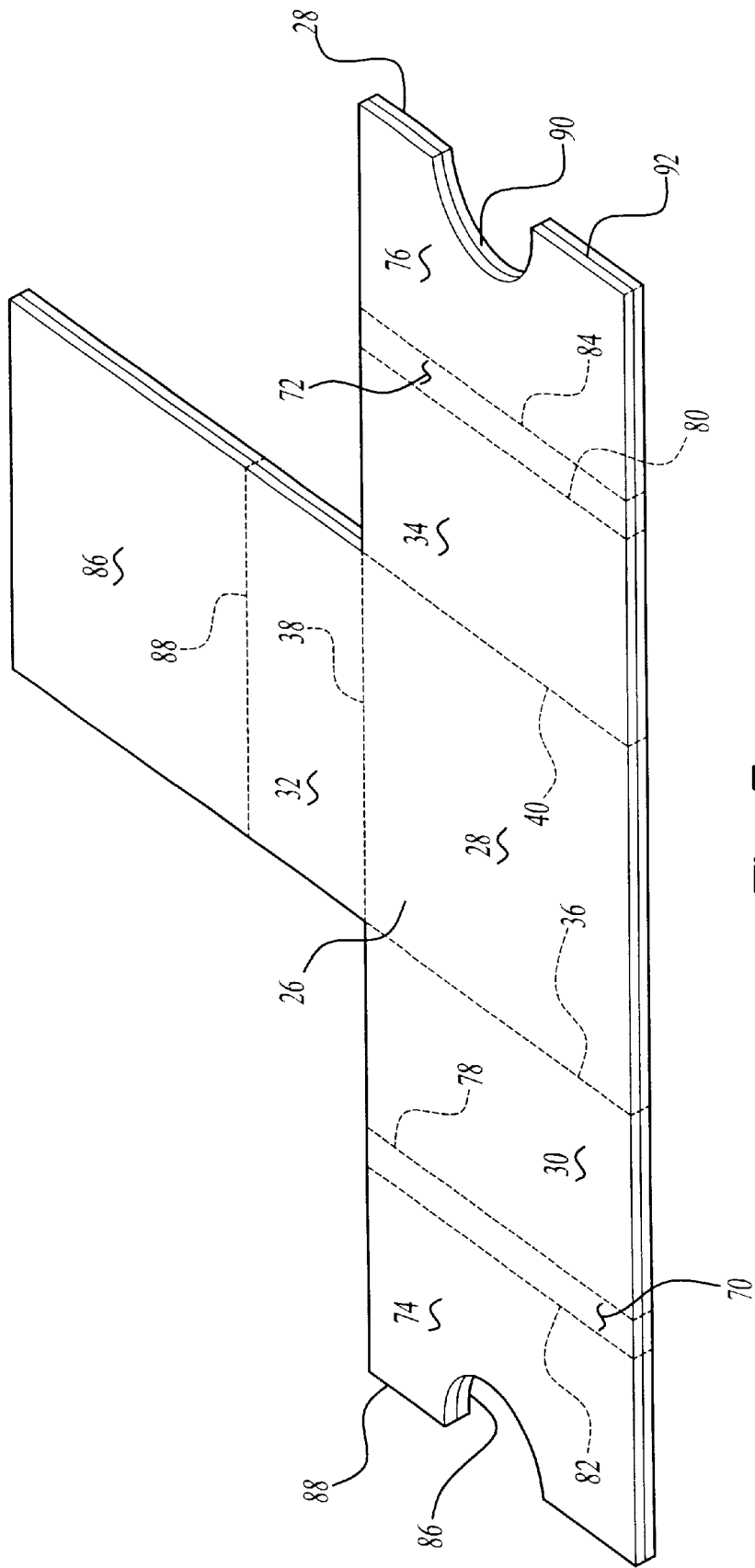
FIG. 7 is a perspective view of the pre-folded device of the present invention including a cargo cover.

As shown in FIG. 7, a cargo cover 86 can also be directly molded into the pick-up bed/fenders component 20. Cargo covers protect the contents in the pick-up bed when it is in the closed position. Preferably, the cargo cover 86 is a generally rectangular section that is attached to the second side wall section 32 along an eighth hinge edge 88. When the cargo cover 86 is in the closed position, it rests on the connecting sections 70, 72.

Figure 8:
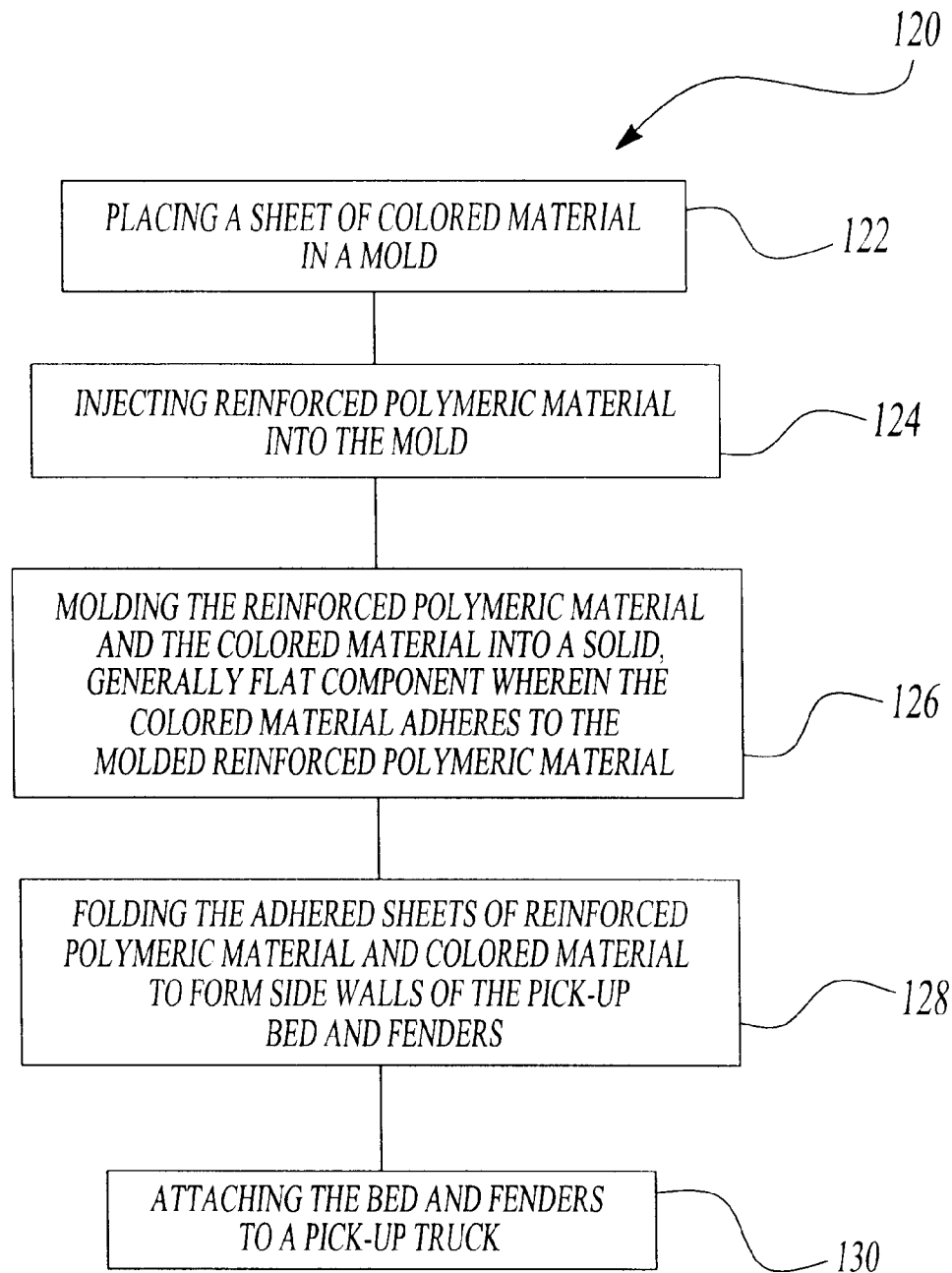
FIG. 8 is a flowchart diagram illustrating the preferred method of this invention.

FIG. 8 schematically illustrates the preferred method of forming the pick-up bed with fenders 20. The flow chart 120 includes a first step at 122 where a sheet of colored material 26 is placed in a mold 27, 29. Preferably, the sheet of colored material 26 is heated so that it becomes more pliable. At 124 a reinforced polymeric material 24 is injected into the mold 27, 29. Preferably, the reinforced polymeric material 24 is injected onto the back of the colored sheet 26 and the mold is closed. At 126 the reinforced polymeric material 24 and the colored material 26 are molded into a solid, generally flat component 20 wherein the colored material 26 adheres to the molded reinforced polymeric material 24. The adhered reinforced polymeric material 24 and colored material 26 are folded to form side walls of the pick-up bed and fenders, as shown at 128. At 130, the bed and fenders 20 are attached to a pick-up truck 22.

A suitably tough plastic is preferably used. A worker in this art would be able to select an appropriate plastic.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A vehicle pick-up bed, comprising:
    a molded, generally flat sheet of reinforced polymeric material including fender sections; and
    a generally flat sheet of colored material that is aligned with and attached to said sheet of reinforced polymeric material;
    wherein said sheets of reinforced polymeric material and colored material form a generally flat component defining a plurality of body panels including said fender sections that are formed from folding said component along pre-determined portions.

2. The pick-up bed of claim 1, wherein said sheet of colored material is a paintless polymer film.

3. The pick-up bed of claim 1, wherein said sheet of colored material is pre-painted aluminum.

4. A vehicle pick-up bed, comprising:
    a molded, generally flat sheet of reinforced polymeric material including fender sections; and
    a generally flat sheet of colored material that is aligned with and attached to said sheet of reinforced polymeric material;
    wherein said sheets of reinforced polymeric material and colored material form a generally flat component and said component is folded into shape wherein said component forms a center section, a first side wall section connected to said center section, a second side wall section connected to said center section, a third side wall section connected to said center section, a first connecting section connected to said first side wall section, a second connecting section connected to said third side wall section, a first fender section connected to said first connecting section and a second fender section connected to said second connecting section.

5. The pick-up bed of claim 4, wherein said center section is generally rectangular having a first hinge edge, a second hinge edge and a third hinge edge; said first section is generally rectangular shaped and connects to said center section along said first hinge edge; said second section is generally rectangular shaped and connects to said center section along said second hinge edge; and said third section is generally rectangular shaped and connects to said center section along said third hinge edge.

6. The pick-up bed of claim 5, wherein said first side wall section has a fourth hinge edge along an edge opposite said first hinge edge, said third side wall section has a fifth hinge edge along an edge opposite said third hinge edge; said first connecting section is generally rectangular shaped and connects to said first side wall section along said fourth hinge edge; and said second connecting section is generally rectangular shaped and connects to said third side wall section along said fifth hinge edge.

7. The pick-up bed of claim 6, wherein said first connecting section has a sixth hinge edge along an edge opposite said fourth hinge edge, said second connecting section has a seventh hinge edge along an edge opposite said fifth hinge edge; said first fender section is generally rectangular shaped and connects to said first connecting section along said sixth hinge edge; and said second fender section is generally rectangular shaped and connects to said second connecting section along said seventh hinge edge.

8. The pick-up bed of claim 7, wherein said first fender section has a semi-circular aperture along an edge opposite said sixth hinge edge and said second fender section has a semi-circular aperture along an edge opposite said seventh hinge edge.

9. The pick-up bed of claim 7, wherein said first, second and third side wall sections are folded toward said colored material along said first hinge edge to form a first side wall, said second hinge edge to form a second side wall and said third hinge edge to form a third side wall.

10. The pick-up bed of claim 9, wherein said first and second connecting sections are folded toward said reinforced polymeric material along said fourth and fifth hinge edges; said first connecting section is folded generally 90° from said first side wall and said second connecting section is folded generally 90° from said third side wall.

11. The pick-up bed of claim 10, wherein said first and second fender sections are folded toward said reinforced polymeric material along said sixth and seventh hinge edges; said first fender section is folded generally 90° from said first connecting section and said second fender section is folded generally 90° from said second connecting section.

12. The pick-up bed of claim 11, wherein said first fender section opens for access to a storage area between said first side wall and said first fender section and said second fender section opens for access to a storage area between said third side wall and said second fender section.

13. The pick-up bed of claim 11, wherein said first and second side walls and said second and said third side walls are connected.

14. The pick-up bed of claim 13, wherein said first and said second side walls and said second and said third side walls are connected by plastic welding.

15. The pick-up bed of claim 13, wherein said first and said second side walls and said second and said third side walls snap together.

16. The combined pick-up bed/fender section for a vehicle, comprising:
a pair of opposed fender sections at laterally outer edges of said bed/fender, there being sidewalls positioned laterally inwardly of each said fender section, there being an integral connecting portion connecting said sidewalls and said fender portion, and a bed portion connecting said sidewalls, said bed portion generally lying in a first plane, said connecting portions being generally parallel to said first plane, and said sidewalls and said fender section being generally perpendicular to said plane, and said bed portion, said sidewalls, said connecting portion and said fender section all being integrally molded as a sheet of plastic.

17. The combined bed/fender of claim 16, wherein a third sidewall section extends generally perpendicular to said first plane, and extends laterally between said first and second sidewalls.

18. A combined bed/fender as set forth in claim 16, wherein said plastic sheet includes covering colored material to provide a color to said combined bed/fender.

19. The combined bed/fender of claim 16, wherein hinges are formed between each of said sections during the molding of said sheet.

20. A method of forming a vehicle pick-up bed, comprising the steps of:
(A) placing a sheet of colored material in a mold;
(B) injecting reinforced polymeric material into the mold;
(C) molding said reinforced polymeric material and said colored material into a solid, generally flat component wherein said colored material adheres to said molded reinforced polymeric material;
(D) folding said adhered sheets of reinforced polymeric material and colored material to form side walls of the pick-up bed and fenders; and
(D) attaching the bed and fenders to a pick-up truck.

* * * * *